Figure 1:
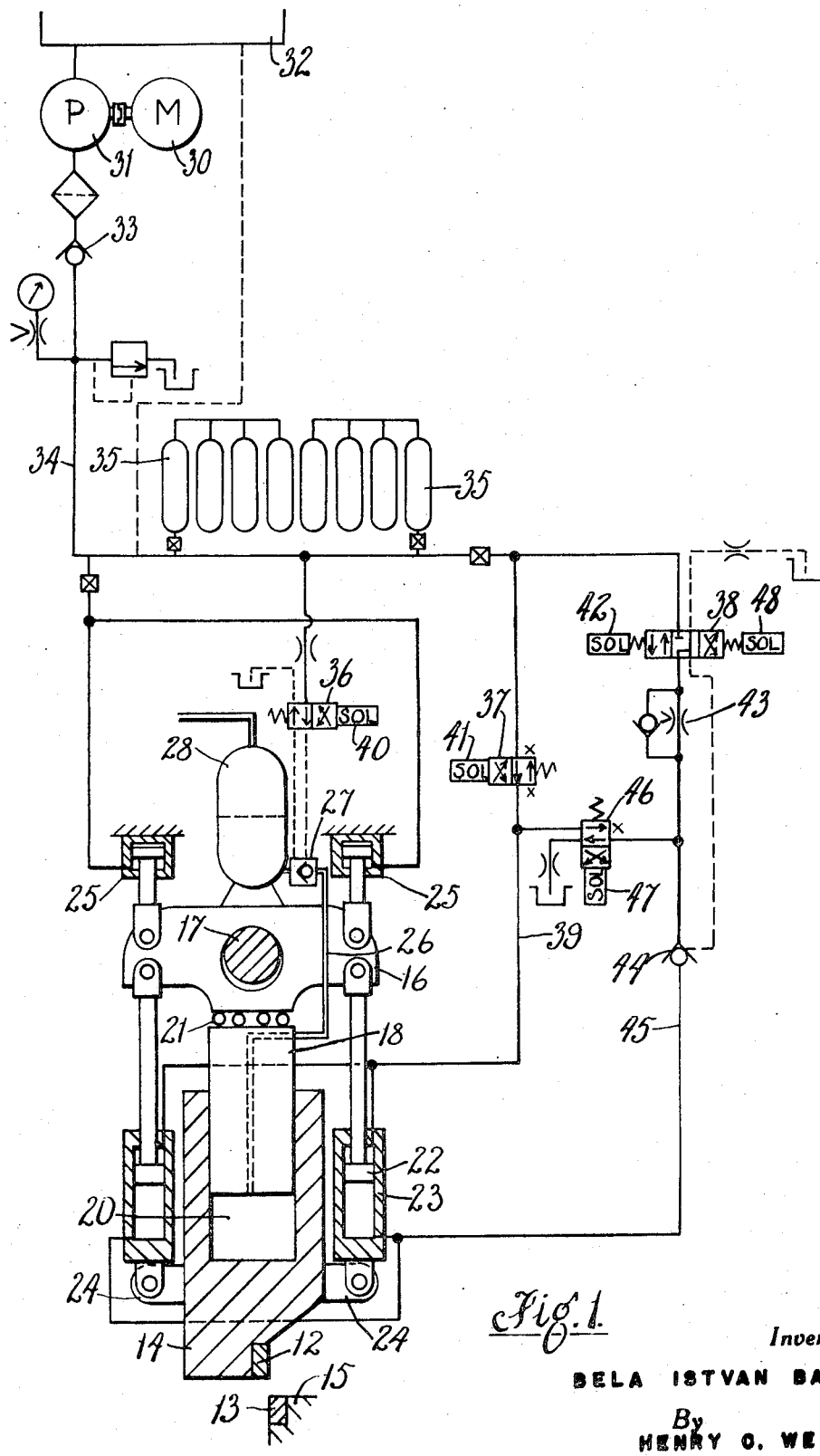

United States Patent
Bathory

[11] 3,730,036
[45] May 1, 1973

[54] DEVICES FOR APPLYING FORCES

[75] Inventor: Bela Istvan Bathory, Yorkshire, England

[73] Assignee: Davy and United Engineering Company Limited, Sheffield, England

[22] Filed: Feb. 2, 1971

[21] Appl. No.: 111,996

[30] Foreign Application Priority Data

Feb. 4, 1970 Great Britain..................5,399/70

[52] U.S. Cl. ..................83/554, 83/627, 83/628, 83/639, 100/270, 100/292
[51] Int. Cl. ................................................B26d 5/08
[58] Field of Search..................83/554, 556, 557, 83/639, 558, 636, 530, 527, 627, 628; 100/270, 271, 292

[56] References Cited

UNITED STATES PATENTS

| | | | |
|---|---|---|---|
| 167,202 | 8/1875 | Stannard | 83/527 |
| 1,796,356 | 3/1931 | Beatty | 83/554 X |
| 3,279,292 | 10/1966 | Beard | 83/639 X |
| 3,077,134 | 2/1963 | Ronick | 83/639 X |
| 3,473,427 | 10/1969 | Leibinger | 83/527 |
| 3,453,914 | 7/1969 | Lemper et al. | 83/554 X |
| 3,081,659 | 3/1963 | Theobald | 83/554 |

FOREIGN PATENTS OR APPLICATIONS

| | | | |
|---|---|---|---|
| 2,721 | 2/1915 | Great Britain | 100/271 |

Primary Examiner—Andrew R. Juhasz
Assistant Examiner—James F. Coan
Attorney—Henry C. Westin

[57] ABSTRACT

A shear comprises two co-operating force-applying members such as blade holders with a shear blade, one of the members is coupled to a short stroke reciprocatable drive member such as a rotary eccentric and a crosshead, and one of the members is connected to a variable spacing device which is in the form of at least one piston and cylinder, the cylinder is sealed off during movement of the drive member in one direction and the cylinder is permitted to move relative to its piston in the reverse direction of movement of the driving member so that a workpiece can be cut in a series of shearing operations.

9 Claims, 3 Drawing Figures

Inventor
BELA ISTVAN BATHORY
By
HENRY C. WESTIN
Attorney

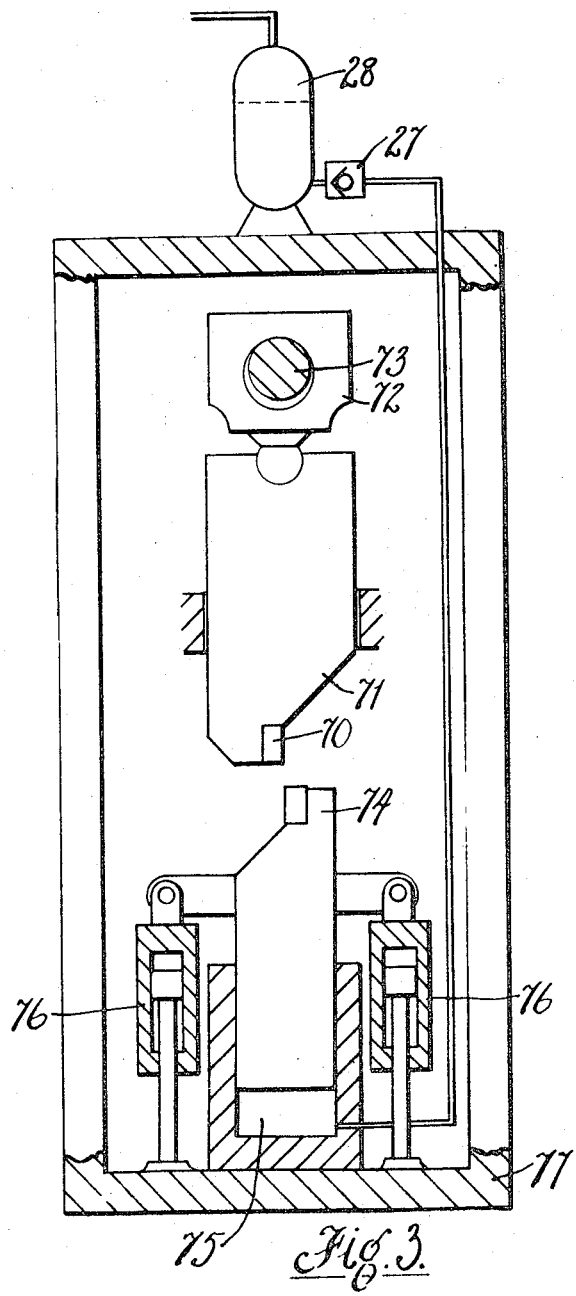

DEVICES FOR APPLYING FORCES

This invention relates to devices for applying forces to workpieces, particularly of metal. The invention is primarily concerned with a shear, which is operated by relatively short stroke reciprocating means and which applies a high force over a relatively long distance. Thus the invention is applicable to a shear for progressively cutting a thick metal workpiece in a series of cuts.

In such a shear there is a driven member which is reciprocated towards and away from the workpiece with a throw considerably less than the maximum workpiece thickness to be sheared and a variable spacing device connecting the driving member with one of the blade holders. This spacing device transmits the movement of the driving member to the blade holder during the motion of the latter in this cutting direction; on the return movement of the driving member, the spacing device is operated to increase the spacing between the driving member and blade holder, so that on the next cycle of the driving member, a further cut is effected. The cycles of the driving member continue until the entire thickness of the workpiece is sheared.

The problem of such a shear is centered on the difficulty of adjusting the spacing device appropriately in the small time period available during the return motion of the driving member. To be effective the shear must perform the entire shearing action in a limited space of time; with the limited movement available from, say, an eccentric, a number of reciprocations must be effected in this time, with the result that the adjustment of the spacing device must be performed quickly. If the spacing device is a screw for example, it must be heavy and robust to stand up to the duties it is required to perform and this in turn entails powerful motors to accelerate and drive the device.

According to the present invention a shear comprises two cooperating force applying members, a reciprocatable drive member coupled to one of the force applying members and a variable spacing device connected to one of the force applying members, the variable spacing device being in the form of at least one piston and cylinder the cylinder of which is sealed off during movement of the drive member in one direction but is permitted to move relative to its position in the reverse direction of movement of the driving member.

The drive member may be coupled to and the variable spacing device connected to the same force applying member.

The cylinder may be connected with an accumulator for liquid through a valve which is closed during movement of the drive member in the first direction and opened during movement in the opposite direction to permit transfer of liquid between the cylinder and accumulator.

The force applying members are usually in the form of blade holders and there may be additional means acting on at least the blade carrier associated with the variable spacing device to retain the associated blade in contact with the work during the return movement of the drive member. These means may comprise one or more piston and cylinder assemblies which are operable to return the blade holder to a starting position relative to the drive member after shearing has been effected.

Figure 2:
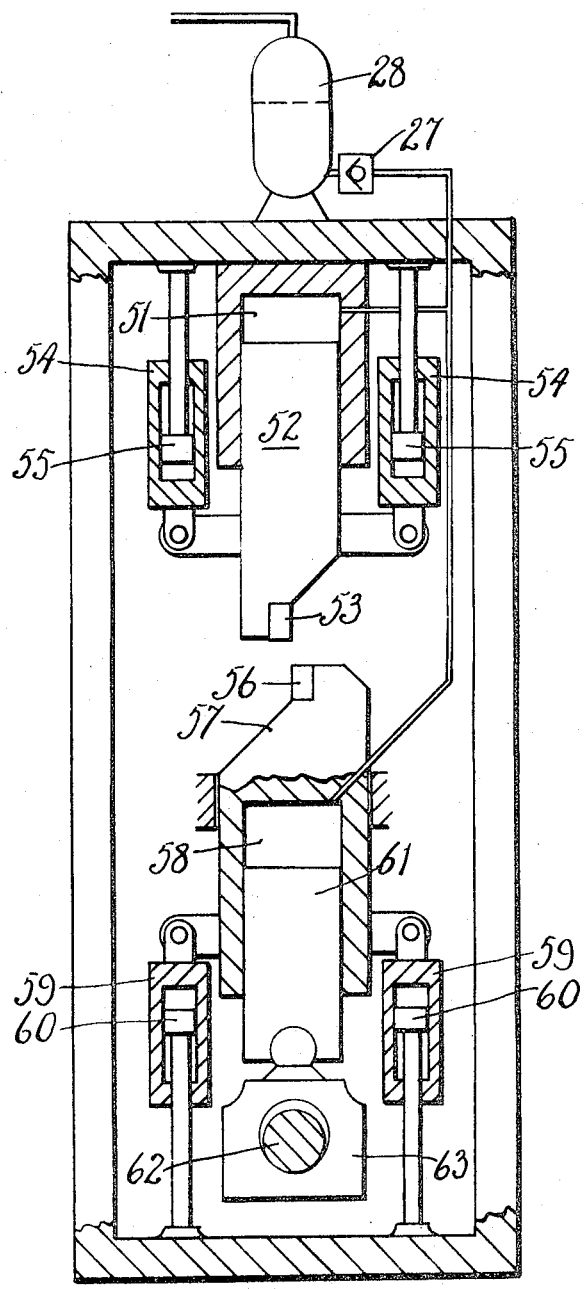

In order that the invention may be more readily understood it will now be described, by way of example only, with reference to the accompanying drawings in which:

FIG. 1 shows schematically a shear according to one embodiment of the invention with its hydraulic circuit, FIG. 2 shows schematically a shear in accordance with a second embodiment of the invention, and FIG. 3 shows schematically a shear in accordance with a still further embodiment of the invention.

Referring to FIG. 1, a shear is constituted by an upper blade 12 and a lower shear blade 13, carried respectively by blade holders, 14, 15. The upper blade holder 14 is driven by a reciprocating driving member, shown as a crosshead 16 mounted on a rotary eccentric 17 and acting on the blade holder 14 through a variable spacing device, which takes the form of a piston 18 sliding in a cylinder 20 formed in the blade holder 14. Interposed between the crosshead 16 and the piston 18 is a ladder bearing schematically indicated at 21; alternatively the crosshead 16 may be replaced by a pitman mounted on the eccentric 17 and pivotally connected to the piston.

Return piston 22 and cylinder 23 assemblies are connected between the crosshead 16 and brackets 24 on the blade holder 14. The crosshead is additionally biased upwardly by the piston and cylinder assemblies 25.

The hydraulic circuit is also illustrated in the figure. The cylinder 20 is connected through a pipe 26 passing through piston 18 and prefill valve 27 to an accumulator 28, which contains liquid, such as water, and which is subjected to moderate gas pressure, e.g., 60 psi.

A motor 30 drives a pump 31 which takes liquid from a tank 32 and passes it via non-return valve 33 and line 34 to accumulators 35, the pressure being maintained at a relative high value, such as 2700 psi.

Line 34 is connected to the assemblies 25 and to valves 36, 37 and 38, all of which are shown in their de-energized state. Valve 36, when actuated by its solenoid 40 applies pressure to open prefill valve 27. Vale 37, when its solenoid 41 is de-energized, connects line 34 via line 39 to cylinders 23 above the pistons 22; when solenoid 41 is energized this connection is broken. When solenoid 42 of valve 38 is energized, line 34 is connected to cylinders 23 below pistons 22 through throttle valve 43, non-return valve 44 and line 45; when its solenoid 48 is energized, throttle valve 43 is connected to drain and line 34 is connected so as to open valve 44. A further valve 46 when operated by its solenoid 47 connects line 39 with throttle valve 43.

The throw of eccentric 17 is small compared with the maximum thickness of workpiece to be cut; for example the throw may be 1¼ inch against a maximum workpiece thickness of 14 inches. Cutting is effected in a number of revolutions of the eccentric, each performing a cut of rather less than twice the throw, and the blade 12 remaining in contact with the workpiece after each downward movement of the crosshead, so that the next eccentric revolution performs the next cut.

With the workpiece on the blade 13, the blade holder 14 is made to approach the workpiece by energizing solenoid 40, putting cylinder 20 into communication with accumulator 28, and energizing solenoids 41, 42 and 47. Pressure is applied to both ends of each of cylinders 23 and as the lower surface of each cylinder has a greater effective area than the upper, the blade holder 14 is caused to move down until brought to rest by the workpiece.

The eccentric is now rotated causing the crosshead 16 and piston 18 to reciprocate vertically. The energization of solenoid 40 is synchronized with the movement of the crosshead, being de-energized during the down stroke and energized during the up stroke; solenoids 41, 42, 47 remain energized.

During each down stroke of crosshead 16, the de-energization of solenoid 40 closes valve 27 and causes the liquid in cylinder 20 to be sealed off. The downward movement of piston 18 is therefore transmitted to blade holder 14 with only a small reduction due to the compressibility of the trapped liquid, and the work is cut. During the return upward movement of the crosshead, valve 27 is open and, although the piston 18 follow the crosshead upwards by virtue of the pressure of liquid in the cylinder 20, the blade holder 14 remains stationary with the blade 12 in contact with the work because of the downward force applied by liquid in cylinders 23. On the next downward stroke of the crosshead, valve 27 is again closed so that the blade holder 14 is again driven down, and a further cut is effected. The cutting cycles are continued until the work has been sheared.

After shearing, the blade holder is returned to its original position relative to the cylinder 18 and crosshead 16. This is effected by energizing solenoid 40, to open valve 27, and solenoid 48 to connect throttle valve 43 to drain. Solenoid 47 is de-energized closing valve 46, and solenoid is de-energized connecting line 39 to line 34. Pressure is thus applied above the pistons 22 driving the blade holder 14 upwards, while liquid driven out of the cylinders through line 45 passes valve 44 and is discharged to drain through valve 38 and valve 46.

The hydraulic nature of the variable spacing device (the piston 18 and cylinder 20) between the eccentric 17 and the blade holder 14 permits the relative movement between the blade holder and the crosshead to take place in the small time interval available during the upward return movement of piston 18, and without the use of excessively high power motors. Thus the motor 30 may have a power of say 35 horse-power, which would need to be drastically increased if the spacing device took the form of motor driven screws.

Referring now to the embodiment of the invention illustrated in FIG. 2, a rigid frame 50 supports a cylinder 51 containing a piston 52 which is secured or forms part of an upper blade holder which supports a blade 53. A pair of brackets on the blade holder are connected to a pair of cylinders 54 each containing a piston 55. The pistons are secured to the frame 50.

The lower blade 56 is positioned in a blade holder 57 which defines a cylinder 58. The cylinder is connected to a pair of additional cylinders 59 each containing a fixed piston 60. A piston 61 is reciprocatable in the cylinder 58 by means of a rotary eccentric 62 and a pitman 63. The piston 61 and cylinder 58 constitute the variable spacing device. The two cylinders 58 and 51 are connected via a pre-fill valve 27 to an accumulator 28. The hydraulic circuit is essentially the same as that shown in FIG. 1.

The workpiece to be sheared is positioned with the shear blades engaging opposite surfaces. The two cylinders 51 and 58 are pre-filled with liquid and the valve 27 is closed. The drive member is then operated to lift the lower shear blade into shearing relation with the workpiece. As the piston 61 is lowered the pre-fill valve is opened to allow the cylinder 58 to be topped up while the piston-cylinder devices 59 – 60 keep the lower blade holder in contact with the workpiece. The valve 27 is then closed and the shearing operation repeated as many times as is necessary to sever the workpiece. The piston-cylinder devices 54 – 55 serve to raise the upper blade holder from the workpiece after the shearing operation has been completed.

In the arrangement shown in FIG. 3 the variable spacing device is associated with one force applying member, the lower blade holder, and the drive member is associated with the upper blade holder.

The upper blade 70 is carried in a holder 71 which is pivotably secured to a pitman 72. The pitman is reciprocated by a rotary eccentric 73. The lower blade is secured in a holder 74 which constitutes a piston in a stationary cylinder 75. A pair of piston-cylinder devices 76 are attached to lugs extending from the blade holder and are anchored to a rigid frame 77. The cylinder 75 is connected through a line 77 to a pre-fill valve 27 and to an accumulator 28.

In use the workpiece is brought by the lower blade holder into contact with the upper blade. The valve 27 is closed and a cutting action of the upper blade is brought about. The workpiece is lifted by the lower blade holder into engagement with the returned upper blade and a further cutting operation is carried out.

In accordance with the provisions of the patent statutes, I have explained the principle and operation of my invention and have illustrated and described what I consider to represent the best embodiment thereof.

I claim:

1. A shear comprising an upper shear blade arranged in cooperation with a lower shear blade to sever a workpiece placed therebetween, said blades being supported in upper and lower blade holders respectively, at least one of the blade holders being displaceable in guides in the direction towards the other blade holder and said displaceable blade holder having hydraulic means associated therewith for displacing the holder and its blade until the separation of the blades is equal to the thickness of the workpiece to be severed, drive means having a reciprocating action in alternate first and second opposite directions, and wherein in said first direction of reciprocation the drive means is coupled to one of said blade holders to displace said blade holder in the direction towards the other blade holder through a distance which is small compared with the original separation of the blades, to produce a cut in the workpiece and hydraulic means for holding said blades in contact with the workpiece during the movement of the drive means in said second direction.

2. A shear as claimed in claim 1 in which the drive means is a rotatable eccentric member associated with a crosshead.

3. A shear as claimed in claim 1 in which the drive means is a rotatable eccentric member associated with a pitman.

4. A shear as claimed in claim 1 in which the hydraulic means for holding the blades in contact comprise a piston displaceable in a cylinder defined in the blade holder associated with the drive means, said piston being permanently connected to the drive means, and valve means associated with the cylinder, said valve means serving to lock a supply of liquid under pressure in the cylinder during the movement of the drive means in the first direction and to connect said cylinder with a source of liquid under pressure during the movement of the drive means in said second direction.

5. A shear as claimed in claim 4 in which the lower blade and its holder are fixed and the drive means is associated with the upper blade holder.

6. A shear as claimed in claim 5 in which the hydraulic means for displacing the upper blade holder to initially set the separation of the blades comprise piston-cylinder devices connected between the drive means and the upper blade holder and said devices additionally serve to keep the upper blade in contact with the workpiece during movement of the drive means in the second direction.

7. A shear as claimed in claim 4 in which the drive means is associated with the bottom blade and the upper blade is displaceable towards and away from the lower blade by the hydraulic means for initially setting the gap between the blades.

8. A shear as claimed in claim 7 in which the upper force-applying member is displaceable vertically by a piston-cylinder device and the cylinder of the device is connected with an accumulator for liquid through a valve which is closed during the shearing operation.

9. A shear as claimed in claim 1 in which the drive means is associated with the upper blade holder and the hydraulic means for holding the blades in contact with the workpiece is associated with the lower blade holder and arranged to lift the workpiece in contact with the upper blade during movement of the drive means in the second direction.

* * * * *